United States Patent
Olson et al.

(10) Patent No.: US 9,282,326 B2
(45) Date of Patent: Mar. 8, 2016

(54) INTERACTIVE CAMERA CALIBRATION TOOL

(71) Applicant: The Regents of The University of Michigan, Ann Arbor, MI (US)

(72) Inventors: Edwin B. Olson, Ann Arbor, MI (US); Johannes Strom, Ferndale, MI (US); Andrew Richardson, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/525,709

(22) Filed: Oct. 28, 2014

(65) Prior Publication Data

US 2015/0130951 A1    May 14, 2015

Related U.S. Application Data

(60) Provisional application No. 61/896,326, filed on Oct. 28, 2013.

(51) Int. Cl.
*H04N 17/00* (2006.01)
*G06T 7/00* (2006.01)

(52) U.S. Cl.
CPC ............ *H04N 17/002* (2013.01); *G06T 7/0018* (2013.01)

(58) Field of Classification Search
None
See application file for complete search history.

(56) References Cited

U.S. PATENT DOCUMENTS

| | | | |
|---|---|---|---|
| 6,437,823 B1 * | 8/2002 | Zhang | 348/187 |
| 7,280,706 B2 * | 10/2007 | Wu et al. | 382/275 |
| 8,619,144 B1 * | 12/2013 | Chang et al. | 348/187 |
| 8,662,676 B1 * | 3/2014 | Chang et al. | 353/69 |
| 8,681,224 B2 * | 3/2014 | Mallon et al. | 348/187 |
| 8,730,329 B2 * | 5/2014 | Jiang et al. | 348/187 |
| 8,743,214 B2 * | 6/2014 | Grossmann et al. | 348/188 |
| 8,866,912 B2 * | 10/2014 | Mullis | 348/187 |
| 2003/0007077 A1 * | 1/2003 | Maggi | 348/223.1 |
| 2006/0024041 A1 | 2/2006 | Lou et al. | |
| 2008/0309767 A1 * | 12/2008 | Berestov et al. | 348/187 |
| 2011/0228101 A1 * | 9/2011 | Miksch | 348/175 |
| 2011/0228103 A1 * | 9/2011 | Takemoto et al. | 348/187 |

(Continued)

FOREIGN PATENT DOCUMENTS

| | | |
|---|---|---|
| EP | 2309451 A1 | 4/2011 |
| EP | 2375376 A1 | 10/2011 |
| WO | WO-2013076728 A1 | 5/2013 |

OTHER PUBLICATIONS

B. Atcheson et at "CALTag: High Precision Fiducial Markers for Camera Calibration" Vision, Modeling, and Vizualization (2010).

(Continued)

*Primary Examiner* — Brian Yenke
(74) *Attorney, Agent, or Firm* — Harness, Dickey & Pierce, PLC

(57) ABSTRACT

An interactive camera calibration tool is presented that provides live feedback on the state of the calibration and produces tightly-distributed calibration parameters even when used by novices. Target positions are suggested by the calibration tool. Once the target has been aligned with the target positions, image data of the target is captured and used to compute calibration parameters. This process is repeated until the computed parameters meet the accuracy requirements specified by the user. A novel calibration quality metric is also leveraged to automatically determine whether a calibration is sufficiently accurate.

19 Claims, 10 Drawing Sheets

(56) References Cited

U.S. PATENT DOCUMENTS

2012/0242806 A1    9/2012  Ibrahim et al.
2012/0287232 A1   11/2012  Natroshvili et al.
2013/0113876 A1    5/2013  Zhao et al.
2014/0285676 A1*   9/2014  Barreto et al. ................. 348/187
2015/0288951 A1*  10/2015  Mallet et al. .................... 348/46

OTHER PUBLICATIONS

Edwin Olson "AprilTag: A robust and flexible visual fiducial system", IEEE International Conference on Robotics and Automation (ICRA), 2011.

* cited by examiner

INTERACTIVE CAMERA CALIBRATION TOOL

CROSS-REFERENCE TO RELATED APPLICATIONS

This application claims the benefit of U.S. Provisional Application No. 61/896,326 filed on Oct. 28, 2013. The entire disclosure of the above application is incorporated herein by reference.

GOVERNMENT CLAUSE

This invention was made with government support under FA2386-11-1-4024 awarded by the U.S. Air Force/AOARD. The Government has certain rights in this invention.

FIELD

The present disclosure relates to a computer-assisted technique for calibrating one or more cameras.

BACKGROUND

Applications such as visual odometry, dense reconstruction and colored point cloud segmentation are fundamentally dependent on accurate calibrations in order to extra metrical data from images. The MATLAB and OpenCV packages are two popular systems for calibrating lenses. However, they can be error prone, especially for lenses with significant distortion. This stems from the fact that the quality of a calibration is dramatically affected by the user's choice of calibration images. A user who chooses poor calibration target positions may find the resulting model generalizes poorly to unseen examples. This challenge is particularly acute for novice users, who are not aware of the properties of the underlying estimation and optimization methods, or end-users in dramatically different fields. Even experts may be unsure that the positions they have chosen will yield a sufficiently accurate calibration, as the number of images needed is not constant across lenses and should vary with the quality of the constraints. Consequently, standard practice is to collect many more images than necessary and verify that the model parameter uncertainty and training error are low; if the results are unsatisfactory, the calibration is repeated or updated with additional images. This process is unreliable, and not very satisfying from a theoretical standpoint.

Therefore, the primary goal of this disclosure is to increase calibration repeatability and accuracy in a more principled fashion. This section provides background information related to the present disclosure which is not necessarily prior art.

SUMMARY

This section provides a general summary of the disclosure, and is not a comprehensive disclosure of its full scope or all of its features.

A computer-assisted method is presented for calibrating a camera. Parameters of a camera model are first initialized using image data of a calibration target captured by a camera, where the camera model defines a relationship between an image captured by the camera and a corresponding image without any distortion caused by the camera. The method includes: predicting parameters of the camera model for each of a plurality of candidate target positions, thereby yielding an estimated camera model for each of the plurality of candidate target positions; determining a certainty measure for each of the estimated camera models; selecting a target position from the plurality of candidate target positions, where the selected target position resulted in the estimated camera model having the smallest certainty measure; presenting the selected target position on a display device; capturing image data of the calibration target with the camera while the calibration target is positioned proximate to the selected target position; computing parameters of the camera model using the image data captured by the camera of the calibration target while the calibration target is positioned proximate to the selected target position; and determining a certainty measure for the camera model using the computed parameters of the camera model. The process is repeated until the certainty measure for the camera model is less than a threshold. The result camera model is subsequently used to correct image data captured by the camera.

In one aspect, parameters of the camera model are predicted by predicting where visual fiducials on the target would appear in an image using the parameters of the camera model and when the target is oriented in a given candidate target position, and computing parameters for an estimated camera model in part based on the predicted locations of the visual fiducials. The parameters of the estimated camera model can be computed by applying a least squares optimization method to the predicted locations of the visual fiducials and locations of visual fiducials on the target from previously acquired image data.

In another aspect, a certainty measure for a given estimated camera model is determined by sampling from the distribution for each of the parameters in the given camera model N times, thereby generating N sets of sampled parameters and each set of sampled parameters creates a hypothetical camera model; for each set of sampled parameters, projecting a grid of points into a pixel space using the corresponding hypothetical camera model; computing an expected reprojection error for each point in the grid; and selecting expected reprojection error having the largest value as the certainty measure for the given estimate camera model.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
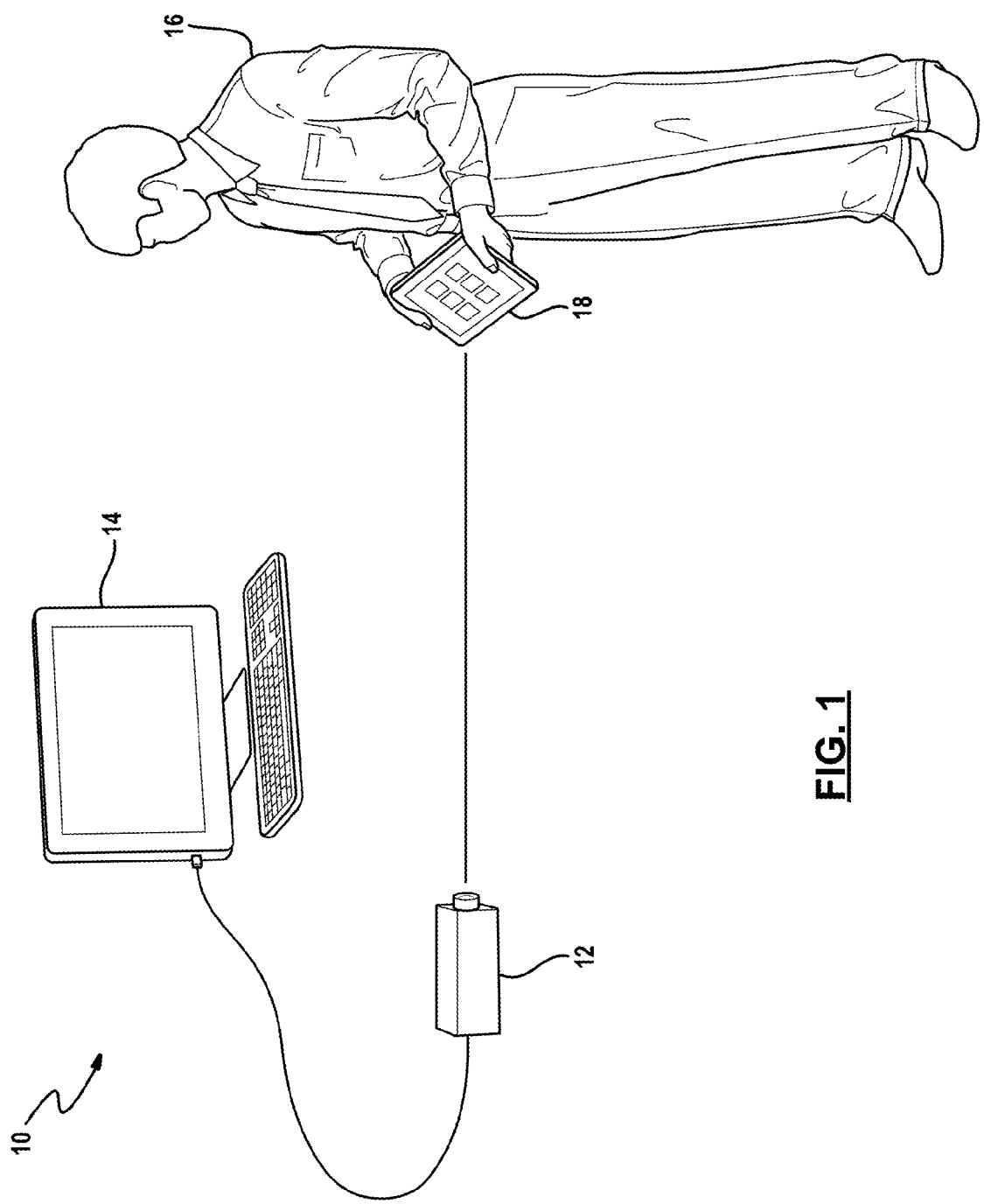
FIG. 1 is a diagram of an interactive system for calibrating a camera.

Example embodiments will now be described more fully with reference to the accompanying drawings.

A wide variety of camera calibration approaches exist, spanning different optimization methods, calibration target styles and intrinsic model designs. Many previous methods have used multiple views of a planar target or a single view of a carefully constructed 3D target. Other methods have used laser pointers or other bright lights to facilitate calibration of networks of cameras. Such approaches typically still require bootstrapping by calibrating some cameras in the network with a constructed target. All of these prior methods share the same approach to calibration: a user first collects a set of images, then runs a batch calibration process on that data. This is in contrast to this proposed approach, where the entire calibration process is interactive and additional data is solicited until the desired accuracy has been achieved.

The dominant paradigm for calibration involved capturing several images of a planar target. These approaches make associations between points detected in the image and corresponding world points on the target whose relative position are known by construction. Simultaneous optimization over the intrinsic parameters for the camera model and the extrinsics for each target yield an estimate of the model parameters. Using such an approach requires the 1) collection of appropriate observational data (usually a plurality of frames, each with a detected set of landmark features), 2) a choice of optimization method and 3) a desired lens model (including either parametric or non-parametric models).

Among the many possible optimization techniques, this disclosure adopts a standard, iterative non-linear-least-squares approach, using a sparse matrix solver as the backend. This method is roughly analogous to standard approaches in GraphSLAM and bundle adjustment. In an example embodiment, the calibration vector x consists of all the model parameters (roughly 10) for the camera, in addition to the 6-DOF position of each calibration target. For each image containing k extracted 2D image points, 2k linearized constraints are added as rows in the Jacobian matrix J. Each row-pair corresponds to projecting a feature from a known 3D coordinate on the calibration target into pixel coordinates, capturing both the unknown position of the camera and the unknown camera parameters. Iterative solutions to Equation 1 yield a locally-optimal set of model parameters for x.

$$J^T \Sigma_z^{-1} J \Delta x = J^T \Sigma_z^{-1} r \quad (1)$$

$$x_{i+1} = x_i + \Delta x \quad (2)$$

Here, $\Sigma_z$ is the matrix of prior covariances for the target detector, and r is the residual, the observed minus the predicted pixel coordinates for each point. The correct convergence of x to the global minimum is sensitive to initialization of $x_0$.

There are also a wide variety of models for camera intrinsics, starting with the fundamental pinhole model. However, using the ideal pinhole model in isolation will poorly capture the behavior of most real world lenses, especially those with a wide field of view. Therefore, many models extend this method by accounting for the lens distortion explicitly. For example, the MATLAB toolbox uses a polynomial Taylor series with 3-5 distortion terms to approximate these effects after projecting with the pinhole camera model. In contrast, this disclosure employs a polynomial as a function of θ, the angle from the principle axis, yields as good or better calibrations, often with fewer distortion terms for the lenses tested, increases the stability of the calibration process, and handles $Z \leq 0$. This is a reduced version of the model introduced by Kannala and Brandt in "A generic camera model and calibration method for conventional, wide-angle, and fish-eye lenses", IEEE Transactions on Pattern Analysis and Machine Intelligence, 28(8):1335-1340, (2006)), which also includes tangential distortion.

The details of this angular polynomial model are shown in Equations 3-8 below where X, Y, and Z represent the 3D position of a point, θ the angle from the principal axis, ψ the angle around the principal axis, $x_{dn}$ the distorted point before converting to distorted pixel coordinates, $x_{dp}$, via the matrix K. The number of distortion coefficients is variable, though three to four are used in this disclosure.

$$\theta = \arctan2(\sqrt{X^2 + Y^2}, Z) \quad (3)$$

$$\psi = \arctan2(Y, X) \quad (4)$$

$$r(\theta) = \theta + k_1\theta^3 + k_2\theta^5 + k_3\theta^7 + k_4\theta^9 + \ldots \quad (5)$$

$$x_{dn} = [r(\theta)\cos(\psi), r(\theta)\sin(\psi)]^T \quad (6)$$

$$K = \begin{bmatrix} f_x & 0 & c_x \\ 0 & f_y & c_y \\ 0 & 0 & 1 \end{bmatrix} \quad (7)$$

$$x_{dp} = K \cdot [x_{dn}, y_{dn}, 1]^T \quad (8)$$

While reference is made to this particular camera model, it is readily understood that the calibration techniques set forth below are applicable to other types of camera models as well, including a conventional pinhole model.

Figure 3:
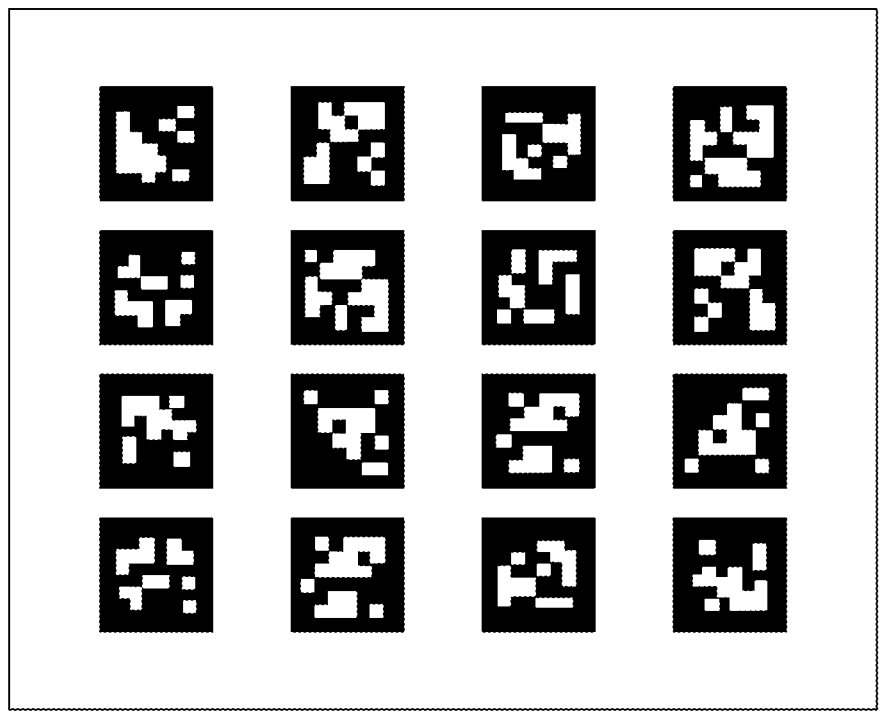
FIG. 3 illustrates an example target for calibrating a camera.

FIG. 1 depicts an example interactive system 10 for calibrating a camera 12. The system 10 is comprised of a camera 12 in data communication with a computing device 14, such as a personal computer. To calibrate the camera 12, a user 16 places a target 18 in the field of view of the camera 12 and the camera 12 captures images of the target. In an example embodiment, the calibration target is further defined as a mosaic of AprilTags, for example as shown in FIG. 3. AprilTags are conceptually similar to QR codes in that they are a type of two-dimensional bar code. AprilTags, however, are designed to encode smaller data payloads, allowing them to be detected more robustly and from longer ranges. Further description for AprilTags can be found in an article by Edwin Olson entitled "AprilTag: A robust and flexible visual fiducial system" In *Proceedings of the IEEE International Conference on Robotics and Automation (ICRA)*, May 2011, which is incorporated by reference herein. Other types of calibration targets also fall within the scope of this disclosure.

The proposed calibration method employs an interactive process that suggests target positions to the user, where the suggested target positions can be displayed on the display of the computing device 14. Once the user aligns the target 18 with the suggested target position, the camera 12 captures images of the target at the suggest target position. The next best target position is computed and the process is repeated until the desired accuracy is achieved. Thus, the computing device 14 verifies in real-time that model parameters meet accuracy requirements specified by the user. In this way, the proposed calibration method improves on the state of the art by offering a virtual calibration assistant that provides suggestions to users and automatically notifies them when the calibration has reached the specified accuracy.

Figure 2:
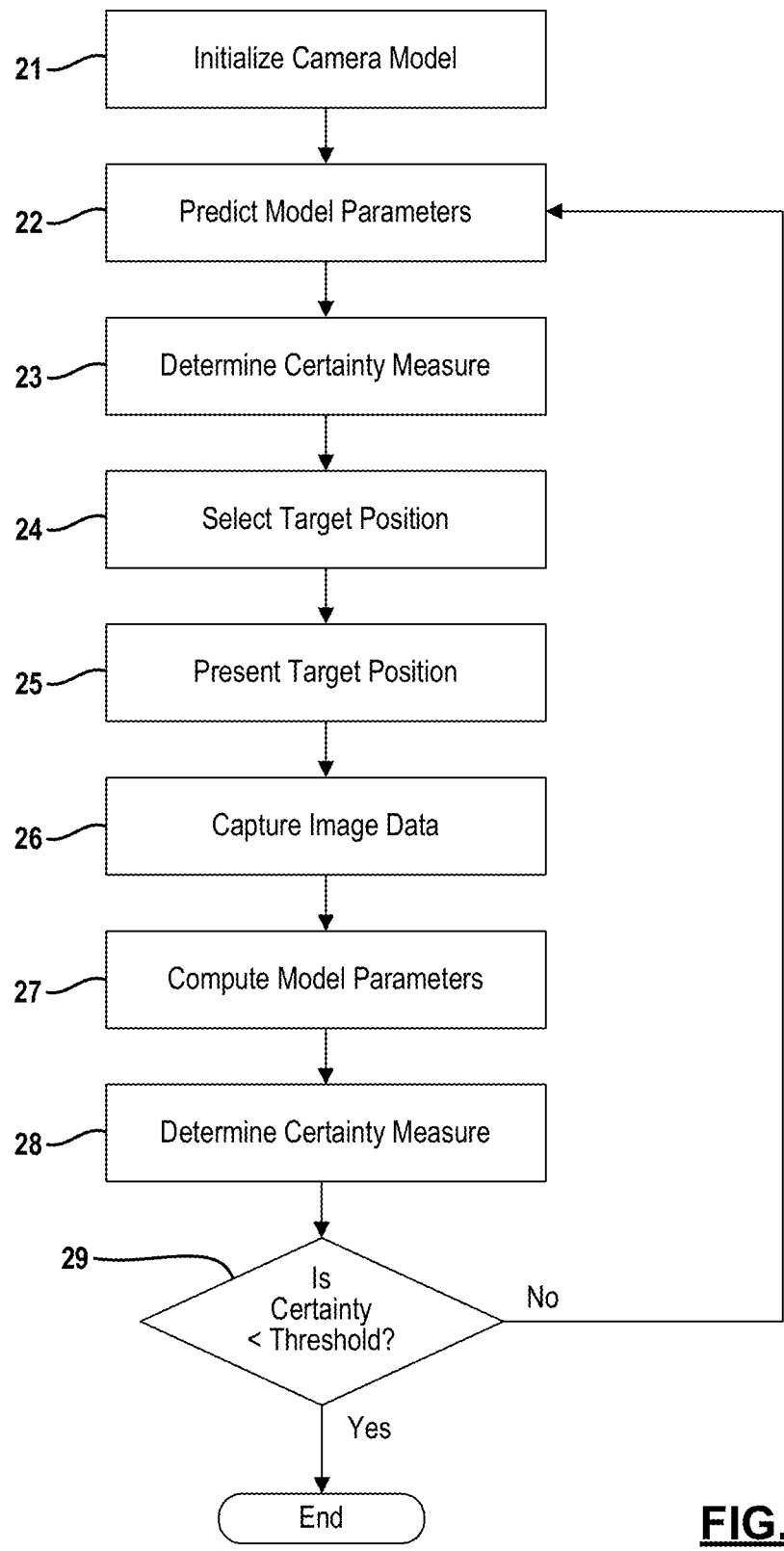
FIG. 2 is a flowchart depicting an example technique for calibrating a camera.

This example method for calibrating a camera is further described in relation to FIG. 2. Suggesting target positions is an inherently cyclic process: making good proposals that are actually realizable given the lens distortion requires a reasonably accurate calibration. However, a good calibration relies on having already captured several target positions to properly constrain all model parameters. Therefore, to initialize the model parameters as quickly as possible, this method initially uses a reduced camera model; at the start of each calibration it is assumed that the focal center is at the center of the image and that there is no image distortion. This allows an estimate of the focal length after a single frame.

This limited model can be used immediately to choose the next-best target position, relaxing the reduced model to the full model, shown in Equations. 3-8, as more frames are taken. This method is intended to select the target positions that best constrain the calibration while avoiding degenerate combinations. The calibration initialization is computed using a standard intrinsics matrix estimation technique— estimating the Image of the Absolute Conic (IAC) from perpendicular vanishing points and then decomposing it to estimate the intrinsics matrix. Using this initialization method, potential suggestions are scored by sampling the observation model to empirically compute the uncertainty of the intrinsic estimate. In other words, suggestions are preferred that yield intrinsic estimates with low variance. In an example implementation, the focal length is estimated over 20 trials, each time adding uniformly-random zero-mean noise to the image coordinates of the tag detections.

Some lenses generate too much distortion for IAC intrinsic matrix estimation. However, methods exist to remove the distortion from a single image. Such methods could be easily added to this calibration technique, but this was unnecessary for the moderately distorted, wide field of a view lenses tested in this work.

Before the first target position suggestion can be shown to the user, a cursory estimate of the camera calibration is obtained as indicated at 21. In an example embodiment, this can be achieved by automatically selecting the first image "behind the scenes" as the user moves the target to the center of the screen. However, the very first frame may not provide a robust initialization. To make this initialization robust, the live image stream is scored and the first frame is replaced (removing the previous one) every time a new frame with a lower intrinsic uncertainty is found, either until a threshold is met, or the first suggestion has been computed and captured. This method reliably picks a satisfactory first frame because the user is guided to move the calibration target to a suggestion as soon as any frame has been captured and the intrinsic matrix has been estimated.

Once the camera model has been initialized, the effect of observing an unobserved frame on the uncertainty of the parameter estimates are be considered. For each candidate target position drawn from a coarse grid in pose space, the intrinsic estimate is scored, where the intrinsic estimate results from the combination of 1) the frames acquired so far (ignoring initial frames that were replaced) and 2) the projection of the candidate calibration target with the current estimates of the calibration parameters are scored. As before, sample from the observation model to estimate the uncertainty of the intrinsic parameters, choosing the suggestion that reduces the parameter variance the most.

In addition to providing full-rank constraints for all parameters of the complete camera model, this bootstrapping process also provides a good initialization for $x_0$ in the optimization described in Equation 1. As the model is successively relaxed, we pass through the initialization from the previous step, yielding good estimates for all the intrinsic parameters. Once the distortion parameters are introduced, they are initialized to zero. Given some intrinsic estimates, these parameters converge well in practice. While a particular method has been described for initializing camera model parameters, other methods also fall within the broader aspects of this disclosure.

Once all intrinsic parameters are fully constrained, the next goal is to find enough additional target observations to ensure that the resulting model parameters are accurate. To do so, image data of the target is captured by the camera at a series of suggested target positions. Each suggested target position is selected from a fixed set of candidate target positions (e.g., 60) regularly distributed through the field of view of the camera. In the example embodiment, camera model parameters and uncertainties are predicted at 22 for each of the candidate target positions, thereby yielding an estimated camera model for each of the candidate target positions. More specifically, for each candidate target position, the position of the visual fiducials (i.e., tags) in pixel coordinates is predicted using the existing camera model and the known appearance of the camera calibration target. This prediction produces the location of the tags in a hypothetical image. For example, this prediction might result in the location of ~30 tags. The location of the tags in the hypothetical image is combined with tag locations from previously acquired N images (e.g., from previous iterations of this procedure), thereby yielding N+1 sets of tag data. Camera calibration parameters for an estimated camera model are computed by applying a non-linear least squares optimization algorithm to the N+1 sets of tag data. This process is repeated for each candidate target position to generate a plurality of estimated camera models.

Next, a certainty measure is then determined at 23 for each of the estimated camera models. Different types of certainty measures are contemplated by this disclosure, including a Mean Reproduction Error or a Mean Squared Error. In the example embodiment, a Max Expected Reprojection Error is used as the certainty measure; further explanation for this certainty measure is provided below. The candidate target position associated with the estimated camera model having the smallest certainty measure is selected at 24 as the next target position and presented to the user at 25 on the display of the computing device 14.

Figure 4A:
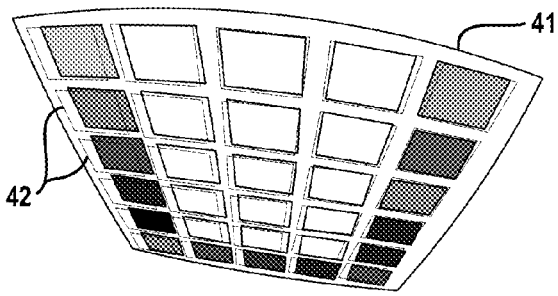
FIGS. 4A-4D are diagrams depicting how a target is aligned with a template for a suggested target position.
Figure 4B:
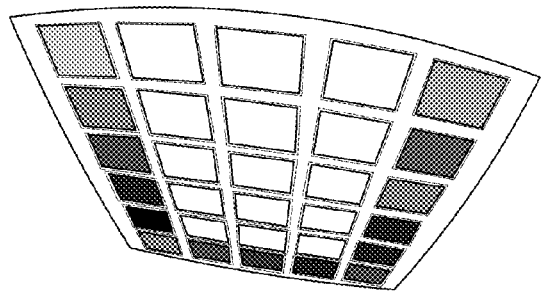
Figure 4C:
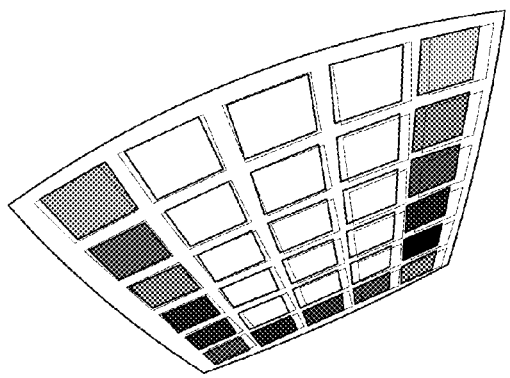
Figure 4D:
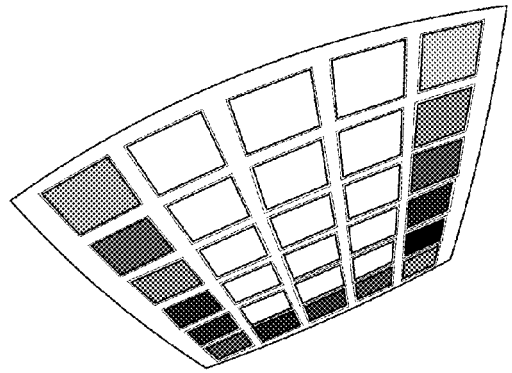

In the example embodiment, a template for the target is superimposed onto a live video feed which is displayed on the computing device 14, where the video feed portrays the target as it is being positioned in the field of view of the camera. Initially, the target 41 does not align with the template 42 (i.e., the selected target position) as seen in FIG. 4A. The user moves the target in an attempt to align the target with the template. In an example embodiment, color cues are used to help properly orient the target in relation to the template. For example, a subset of the tags on the target can be color coded to match frames on the template that they are intended to be aligned with. As the user moves the target, there may be additional visual or audible feedback as to how closely the target aligns with the template. In FIG. 4B, the target is shown aligned with the template 42. It is noted that the template is generated with the current camera model estimate and thus includes any existing distortion. Projecting a template with this distortion helps the user align the target with the template. Rather than being positioned by a user, it is also envisioned that the target could be positioned by an automated mechanical device, such as a robot. Once the target 41 is aligned with the template 42 (within some tolerance), an image of the target 41 is captured by the camera as indicated 26 of FIG. 2.

With continued reference to FIG. 2, parameters for a camera model are computed at 27 using multiple images of targets captured by the camera. From these computed parameters, a certainty measure can be determined at 28 for the camera model. The certainty measure for the camera model is then compared with a threshold as indicated at 29. This process of collecting additional images of the calibration target is repeated so long as the certainty measure exceeds the threshold. That is, model parameters are predicted again for each of the candidate target positions at step 22 using the newly computed camera model parameters from step 27. Once the certainty measure is less than the threshold (typically specified by the user), the calibration is deemed complete.

In one embodiment, the calibration steps described above are implemented by a processor residing in the camera. In other embodiments, a subset of these calibration steps can be implemented by a processor outside of the camera, for example the desktop computer shown in FIG. 1. In any case, it is to be understood that only the relevant steps of the calibration method are discussed in relation to FIG. 2, but that other software-implemented instructions may be needed to control and manage the overall operation of the calibration system.

During subsequent operation of the camera, the final set of computer camera model parameters can be used to correct for lens distortion in the image data reported by the camera. To verify the calibration process, the user may be automatically presented with the rectified video stream. This allows the user to qualitatively verify that the calibration is accurate, primarily by checking for straightness of projected lines.

This calibration method can also be used to calibration a plurality of cameras, for example employed by gauging system in a manufacturing workstation. In one embodiment, each camera is individually calibrated in the manner described above. To determine the relative location of the camera to each other, the calibration target can then be placed in the field of view of the cameras and images are acquired simultaneously by each camera as the calibration target is held in different orientations and positions. Because the preferred calibration target includes uniquely decodable fiducial markers, different cameras are able to observe arbitrary and not necessarily overlapping portions of the calibration target. From these additional images, the position of the cameras is relation to each other can be determined in the manner readily known in the art.

Previous approaches have used Mean Reprojection Error (MRE) and Mean Squared Error (MSE) as measures of calibration quality. However, this is problematic because there are training errors, rather than testing errors. Using one of the prior works, if the training images are selected poorly, the resulting MRE could be low, yet the generalization performance (e.g. as measured on a test set) could be very poor. Unfortunately, collecting a proper testing set can be onerous—for this evaluation an expert-selected set of 60 or more images is used from all over the camera's field of view. Especially for novice users, it is not reasonable to expect they would be able to collect a "good" testing set. Even for expert users, this process is time-consuming and requires careful attention.

Figure 5:
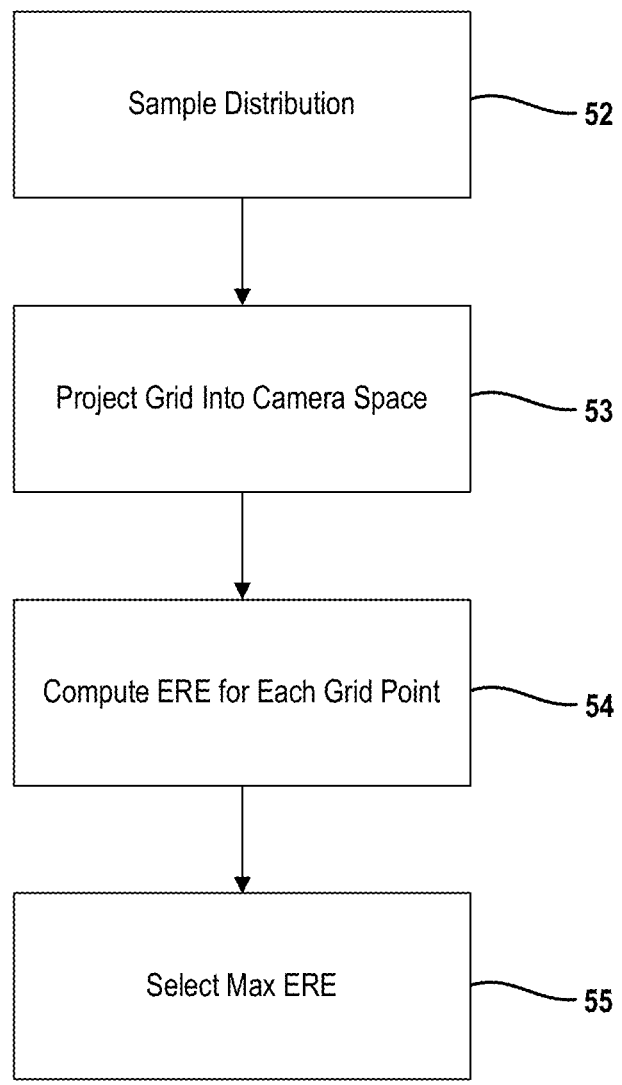
FIG. 5 is a flowcharting depicting an example method for determining a certainty measure for a camera model.
Figure 6A:
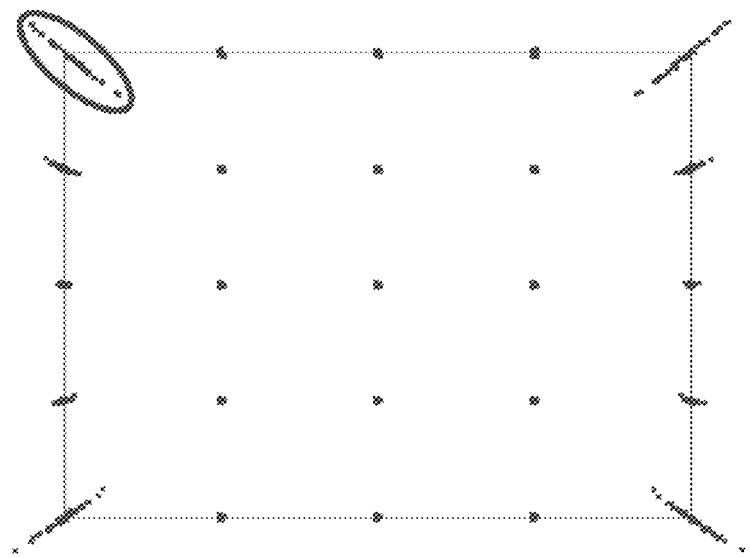
FIGS. 6A and 6B are diagrams of an example grid of points which are projected into a pixel space.
Figure 6B:
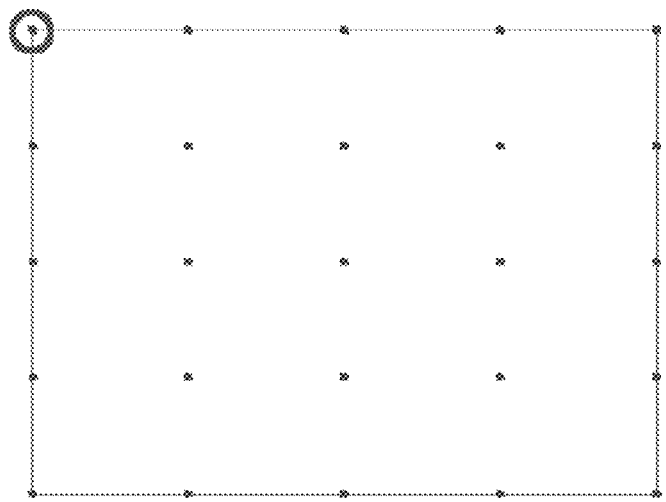

FIG. 5 depicts a more principled estimate of the testing error that can be computed automatically given an intermediate state of calibration. For a given camera model, a certainty measure is computed as follows. Parameters for the camera models are typically represented with a probabilistic description. To begin, the distribution for each parameter in the given camera model is sampled at 52 a fixed number of times (e.g., 1000), such that each set of sampled parameters creates a hypothetical camera model. In the example embodiment, the sampling results in 1000 sets of parameters (i.e., hypothetical camera models). For each hypothetical camera model, a grid of points is projected at 53 into a pixel space of the camera using the set of sampled parameters associated with the hypothetical camera model. The fixed 3D grid points are chosen carefully so that they will project into all parts of the pixel space. The example embodiment uses a 5×5 grid of test points distributed so their projections will uniformly cover the pixel space as seen in FIGS. 6A and 6B (the Max ERE is circled in each grid). Other types of sampling patterns fall within the scope of this disclosure.

Projecting the grid points into the pixel space produces a distribution of pixels for each grid point. That is, a distribution of 1000 pixel results for each of the twenty-five grid points in the example embodiment. An Expected Reproduction Error (ERE) is then computed at 54 for each of the twenty-five grid points. The distribution of reprojected points for any sample point gives a measure of the quality of the current camera calibration estimate. The expected reprojection error can be computed at each point, yielding an expected error (in units of pixels) for each sample point. Since high quality of the calibration over the entire image is usually desired, the present embodiment uses the worst-case expected reprojection error computed for each sample point. This metric is referred to herein as the MaxERE although the broader aspects of this disclosure are not limit to this specific error metric. The ERE having the largest value is selected at 55 as the certainty measure for the given camera model. By selecting the largest ERE, this ensures that the part of the image where the model is currently the most uncertain is properly weighted. Pseudocode for this computation is set forth below.

---

Algorithm 1 COMPUTE_MAX_ERE(currentCalibration)

```
(x, Σ) = getModelPosterior (currentCalibration)
meanCal = makeCal(x)
testPointsXYZ = makeTestGrid(meanCal, 5, 5)
calSamples = [sampleCal₀ (x, Σ), ... , sampleCalₙ (x, Σ)]
MaxERE = 0
for all t⃗ ∈ testPointsXYZ do
    ERE = 0
    for all sampCal ∈ calSamples do
        ERE += (1/n)|meanCal.project(t⃗) − sampCal.project(t⃗)|
    end for
    MaxERE = max(ERE, MaxERE)
end for
return MaxERE
```

---

Computation of the Max ERE uses the estimate of the marginal posterior covariance of the model parameters: $\overline{P}(m|z_0, \ldots, z_n)$. This distribution is derived by first computing the joint distribution of the model parameters and each target extrinsics, given all the observations of those targets. Suppose n images of targets are collected, then "marginalize-out" the target extrinsics:

$$\overline{P}(m|z_0,\ldots z_n) = \int_{T_0,\ldots,T_1} P(m,T_0,\ldots T_n|z_0,\ldots z_n) \quad (9)$$

where $m = \{f_x, f_y, \ldots, k_1, \ldots\}$, $T_i$ is a 6DOF rigid-body transform, and $z_i$ contains the x, y pixel locations of the centers of every AprilTag in image i. In practice, assume the joint distribution in Equation 9 can be approximated as multivariate Gaussian:

$$N(x,\Sigma) = N\left(\begin{bmatrix} m \\ T_0 \\ \vdots \\ T_n \end{bmatrix}, \begin{bmatrix} \Sigma_{m,m} & \Sigma_{m,T_0} & \cdots & \Sigma_{m,T_n} \\ \Sigma_{T_0,m} & \ddots & & \vdots \\ \vdots & & \ddots & \\ \Sigma_{T_n,m} & \cdots & & \Sigma_{T_n,T_n} \end{bmatrix}\right) \quad (10)$$

This allows the marginal $P(m|z_0,\ldots) = N(m, \Sigma_{m,m})$ to be computed trivially by dropping the other rows and columns of the covariance matrix. Computation of Σ requires inverting the sparse dim(x) by dim(x) information matrix I, which is derived from the observed target positions (similar to Equation 1):

$$I = J^T \Sigma_z^{-1} J \quad (11)$$

where each row of J is the linearized projection equation describing how a point on the target projects into the image, given the model parameters m and target position $T_i$. Crucially, this process depends on an estimate for the detector accuracy in pixels, $\sigma_z$, which must be known in advance. For AprilTag, it has been empirically found that the accuracy to be relatively constant across lenses with image width as a satisfactory predictor. Proper focus of the lens is assumed.

$$\sigma_z = 7 \times 10^{-5} \times \text{width} \quad (12)$$

Detector accuracy was fit independently for a number of camera configurations (see FIG. 8) using 60+ image calibration datasets for each. The resulting accuracies were then used to compute the linear model in Equation 12.

In an example embodiment, the proposed calibration method is implemented in Java and runs at 25 FPS with 640×480 images on a quad-core Intel i7-3740QM @ 2.7 GHz. Using a mosaic of AprilTags as the calibration target allows automatic detection of the target at video rates, with processing time typically dominated by AprilTag detection. It has been found that rigid mounting at an office supply store is inexpensive and yields a target durable enough for many uses. In addition, individual tags can be detected and recognized tags without observing the entire target. This makes it possible to add constraints in the corners of images, even for highly distorted lenses. In the multi-camera case, this allows calibration of cameras with adjacent, but non-lapping fields of view.

In addition to target detection, the implementation requires significant CPU when determining the next suggestion. In this implementation, a fixed set of about 60 target positions regularly distributed throughout the field of view are scored. This process depends on incorporating hypothetical observations into the calibration optimization framework, and then estimating the marginal distribution over the model parameters. As more images are acquired and the size of the joint distribution grows, this can take up to 1 or 2 seconds. However, this scoring process only occurs a small number of times: once after each suggestion has been achieved by the user.

A series of tests with human subjects were conducted to measure the effectiveness of this calibration method (referred to herein as AprilCal) and to compare it to the widely used OpenCV method. The user population consisted of undergraduate students at the University of Michigan. Only 3 of the 16 subjects reported any previous experience with camera calibration.

The experiment protocol was as follows: each participant was asked to calibrate the same camera and medium-distortion lens with two different methods. A Point Grey Chameleon CMLN-13S2M-CS was used in 648×482 8-bit grayscale mode with a 2.8 mm Tamron lens (Model 13FM281R). This lens has a medium amount of distortion—significant enough that several Taylor series terms are required to model it, but still with a moderate field of view (only 93° horizontal FOV).

The OpenCV's calibration method using automatic checkerboard detection and the calibration method presented above were evaluated. Participants were given a set of printed instructions. If they asked questions to the experimenter, they were given comprehension-level clarification on the instructions or advised to re-read the instructions. Participants then followed a checklist to first collect four samples using OpenCV, followed by four samples using AprilCal. Additionally, participants watched a video demonstrating calibration with each method. In Method A (OpenCV), participants interacted with a GUI showing liver detections of the chessboard, using the "space" key on a wireless keyboard to capture a frame. In Method B (AprilCal), the frames are automatically taken when the participants move the targets close enough to the suggested pose.

In contrast to AprilCal, which provides detailed guidance throughout the calibration, OpenCV's calibrate.cpp provides no in-application suggestions. Therefore, a set of instructions for calibrating was designed with their software. The goal was primarily to emulate the experience of a first-time user who downloads this software from the Internet. Therefore, users were provided with some example pictures from the MATLAB Toolbox web page. The best written instructions found were on the ROS tutorial for monocular camera calibration, which were also included. These are:

checkerboard on the camera's left, right top and bottom of field of view
checkerboard at various sizes
close (fill the whole view)
far (fill ~⅕ of the view)
checkerboard tilted to the left, right top and bottom After reading these instructions, participants were then instructed to take 10-16 images in each of the 4 trials (on the same lens).

The proposed calibration method was evaluated on several fronts. A note on evaluation of calibration quality: in all of the evaluations, the testing error was used to indicate calibration quality. Each testing set is a collection of 60+ images from all over the field of view, including the corners of the images and at various scales. Because we do not have ground truth positions for the targets in the testing set, the error reported is after optimizing the target extrinsics to best fit the fixed model parameters for a given calibration. While this in general results in lower reprojection errors, it ensures that all models are fairly evaluated and still allows discrimination between good and bad calibrations.

Furthermore, Mean Reprojection Error (MRE) is typically reported as a summary of calibration quality, as it is simply to understand and robust to detector error. However, it can also often mask systematic errors in the underlying calibration. Therefore, Max Reprojection Error on the test set is reported—this ensures that calibrations are evaluated by their performance everywhere in the image.

Study results show that novices do a significantly better job calibrating when using AprilCal than when using OpenCV ($p<6.3\times10^{-7}$). For example, with testing set errors averaged over all participants, the testing MRE using OpenCV is approximately three times that when using AprilCal as seen in

TABLE 1

| Dataset | Lens Model | Reprojection Error | |
|---------|------------|------|-----|
| | | Mean | Max |
| OpenCV | Radial, 3 distortion terms | 0.728 | 38.646 |
| AprilCal | Radial, 3 distortion terms | 0.229 | 1.651 |
| AprilCal | Angular, 4 distortion terms | 0.203 | 1.444 |

Figure 7A:
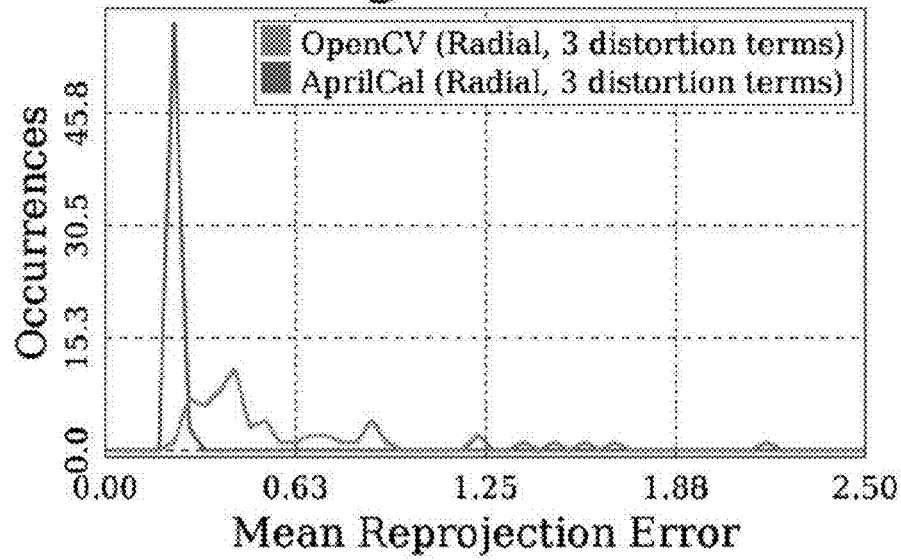
FIGS. 7A and 7B are histograms for the mean reprojection error and the max reprojection error, respectively, for calibrations produced using AprilCal and OpenCV methods.
Figure 7B:
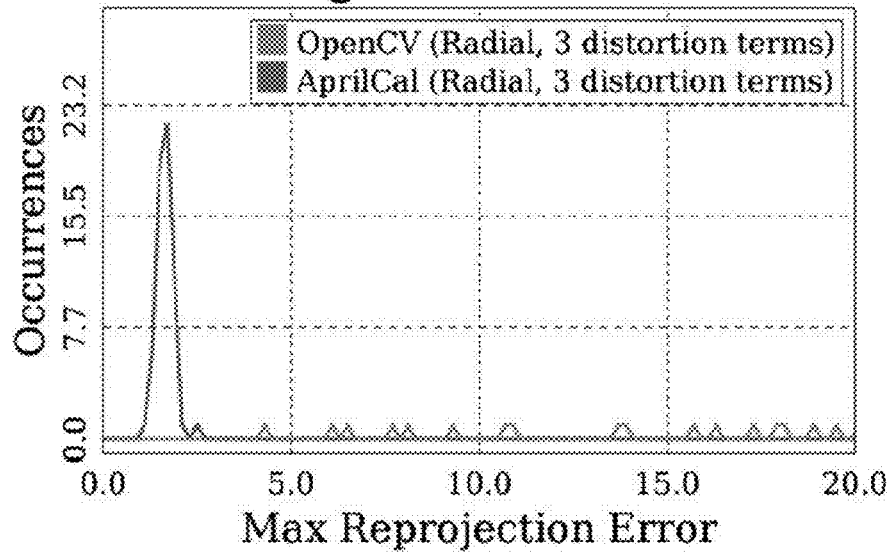

The disparity is even greater when considering the Max Reprojection Errors—OpenCV averages 38 pixels (6% of the image), whereas AprilCal averages a much lower 1.6 pixels for the same model. Interestingly, no OpenCV calibration yielded a max reprojection error better than the worst max reprojection error from AprilCal (2.02 pixels). This may be because the sorts of images that novice users capture, even when attempting to follow the ROS instructions, don't constrain the whole lens well. With the target suggestions provided by AprilCal, even new users of camera calibration software can produce calibrations with very low worst-case reprojection errors. The error histograms for both populations is shown in FIGS. 7A and 7B.

Figure 9:
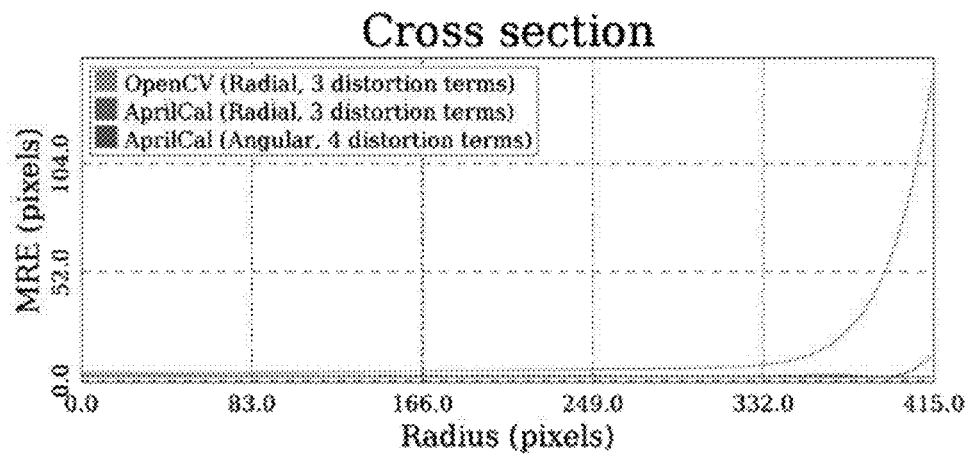
FIG. 9 is a graph depicting per-pixel mean reproduction errors between test subject calibrations and a 65 image testing set.
Figure 10:
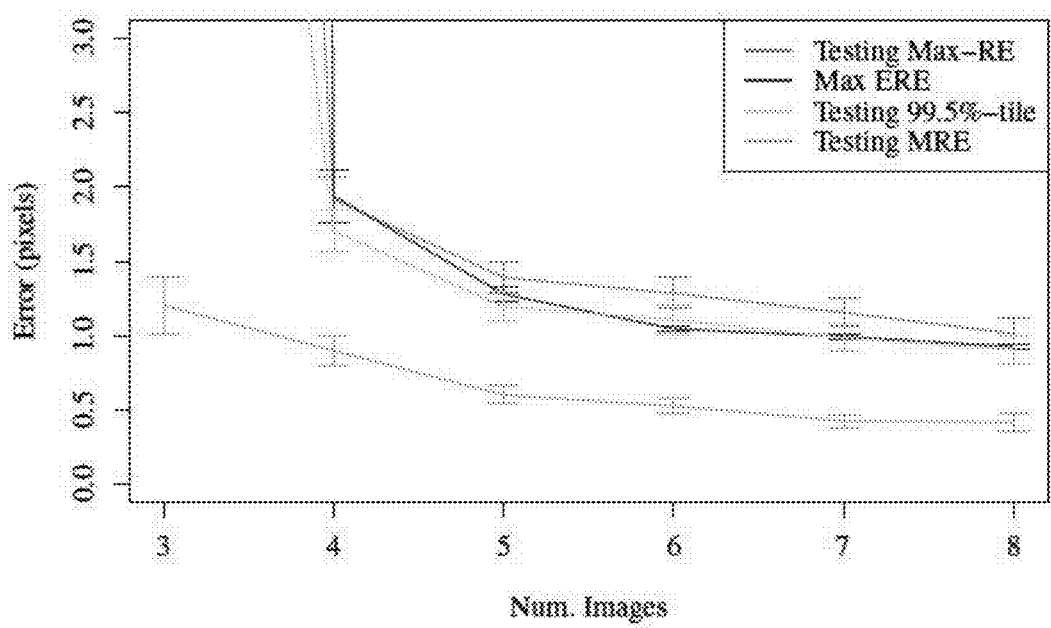
FIG. 10 is a graph illustrating the max expected reprojection error metric correlated with reprojection errors on an independently captured test set.

The human study results can also help us understand where in the image the calibrations disagree. FIG. 9 depict the expected error between the human trials and a 65 image reference calibration. From the images shown, it is clear that the OpenCV calibrations fail to capture the lens model in the image corners. This can be explained by both the need to observe the whole calibration target in OpenCV and the difficulty for users to predict where constraints are needed.

Figures 8A, 8B:
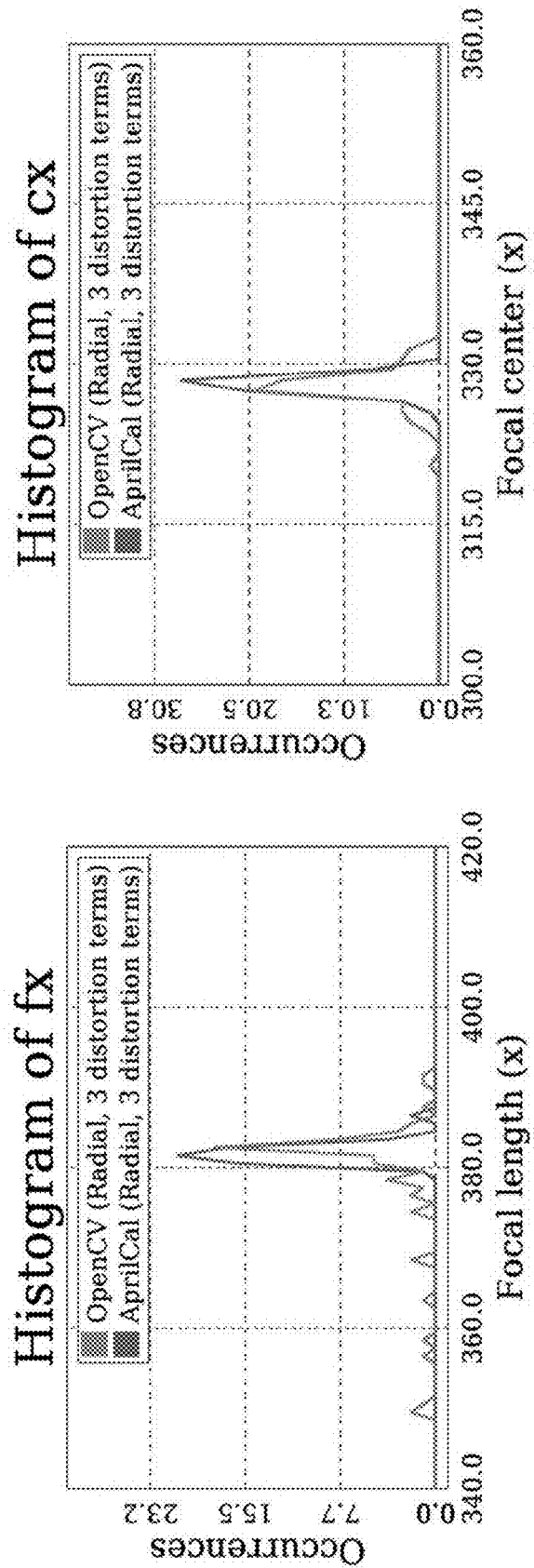
FIGS. 8A and 8B are histograms illustrating the distribution of focal lengths and focal centers, respectively, for numerous test trials.

In addition to showing that AprilCal calibrations are more accurate, the user study results also show that calibrations with AprilCal are more consistent. FIGS. 8A and 8B depict the distribution of focal lengths and focal centers for both AprilCal and OpenCV. While both distributions have similar means, the AprilCal standard deviations are 7.5× smaller for focal lengths and 2.37× smaller for focal centers as seen in the table below.

| Dataset | Focal length (x) | | Focal center (x) | |
|---------|------|---------|------|---------|
| | Mean | Std dev | Mean | Std dev |
| OpenCV | 378.9 | 9.0 | 327.8 | 1.9 |
| AprilCal | 381.7 | 1.2 | 328.0 | 0.8 |

The Max ERE is designed to be a good measure of calibration quality. Specifically, users can specify the accuracy they need for their application (e.g. <1 px), and if the Max ERE falls below that threshold, then the calibration can confidently be said to be that accurate. To validate these claims, several variants of testing error were computed over a large number of AprilCal trials. After each image is added, the performance was evaluated using Max ERE, as well as on an independent testing set using Max ($100^{th}$ percentile), $99.5^{th}$ percentile, and mean reprojection errors. As can be seen in FIG. 8, the sampled-MRE metric corresponds closely to the highest percentiles of testing error. This shows empirical evidence that the Max ERE metric is effective.

Figure 11:
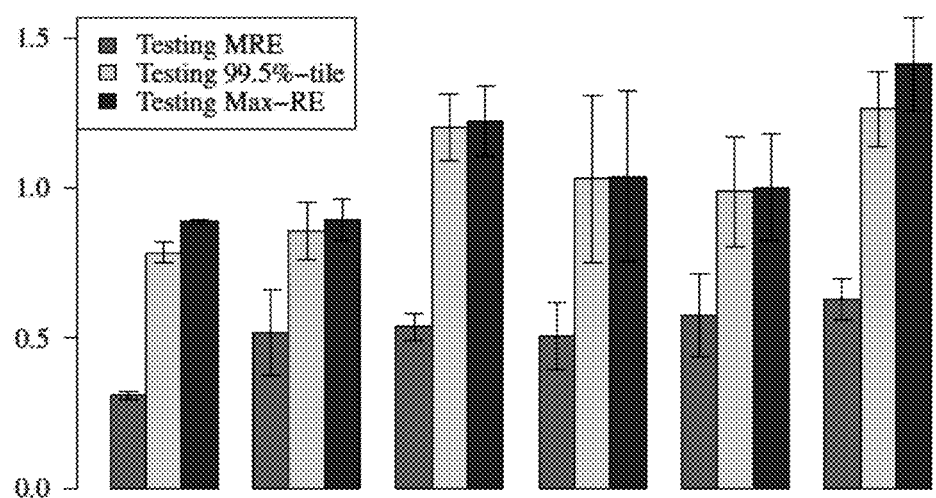
FIG. 11 is a chart depicting testing errors for a variety of camera configurations.

In addition to performing reliably for a wide range of users, AprilCal also produces accurate calibrations for a number of camera and lens configurations. Each lens was calibrated multiple times by one of the inventors using the guidance provided by AprilCal (typically requiring 6-8 images in total). A separate 60+ image testing set was collected to evaluate the accuracy for each configuration. To fairly compare results from different lenses, each lens' testing error is computed against a reference calibration computed from the corresponding test set. This eliminates the effects of detector error on testing error, which varies for different image sizes (See Equation 12). For each target point detected in the testing set, we project through both the reference calibration and the calibration using AprilCal, and compute the Mean, $99.5^{th}$ percentile and Max Reprojections Errors. FIG. 11 shows the testing error for six configurations that the lab uses for various robotics applications, including stereo odometry, object detection and overhead ground truth. Parameters for the six configurations are set forth below.

| | Lens | DFOV | Resolution | Format |
|---|------|------|------------|--------|
| (a) | Fujinon YV2.2×1.4A-2 | 143° | 648 × 482 | Gray |
| (b) | Tamron 13FM22IR | 146° | 648 × 482 | Gray |
| (c) | Tamron 13FM28IR | 114° | 648 × 482 | Gray |
| (d) | Boowon BW38B | 83° | 752 × 480 | Color |
| (e) | Boowon BW3M30B | 121° | 648 × 482 | Gray |
| (f) | Boowon BW3M30B | 121° | 1296 × 964 | Color |

In each case, the testing MRE is significantly below one pixel as seen in the figure.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-assisted method for calibrating a camera, comprising:
    (a) initializing parameters of a camera model using image data of a calibration target captured by a camera, where the camera model defines a relationship between an image captured by the camera and a corresponding image without any distortion caused by the camera;
    (b) predicting parameters of the camera model for each of a plurality of candidate target positions, thereby yielding an estimated camera model for each of the plurality of candidate target positions;
    (c) determining a certainty measure for each of the estimated camera models;
    (d) selecting a target position from the plurality of candidate target positions, where the selected target position resulted in the estimated camera model having the smallest certainty measure;
    (e) presenting the selected target position on a display device;
    (f) capturing, by the camera, image data of the calibration target while the calibration target is positioned proximate to the selected target position;
    (g) computing parameters of the camera model using the image data captured by the camera of the calibration target while the calibration target is positioned proximate to the selected target position; and
    (h) determining a certainty measure for the camera model using the computed parameters of the camera model.

2. The computer-assisted method of claim 1 further comprises repeating steps (b)-(h) until the certainty measure for the camera model is less than a threshold.

3. The computer-assisted method of claim 2 further comprises capturing, by the camera, image data of a scene subsequent to the calibration process and correcting the image data using the computed parameters of the camera model.

4. The computer-assisted method of claim 1 wherein predicting parameters of the camera model further comprises predicting where visual fiducials on the target would appear in an image using the parameters of the camera model and when the target is oriented in a given candidate target position, and computing parameters for an estimated camera model in part based on the predicted locations of the visual fiducials.

5. The computer-assisted method of claim 4 wherein computing parameters for an estimated camera model further comprises applying a least squares optimization method to the predicted locations of the visual fiducials and locations of visual fiducials on the target from previously acquired image data.

6. The computer-assisted method of claim 1 wherein the determination of a certainty measure for a given estimated camera model further comprises
    sampling from the distribution for each of the parameters in the given camera model N times, thereby generating N sets of sampled parameters and each set of sampled parameters creates a hypothetical camera model;
    for each set of sampled parameters, projecting a grid of points into a pixel space using the corresponding hypothetical camera model;
    computing an expected reprojection error for each point in the grid; and
    selecting expected reprojection error having the largest value as the certainty measure for the given estimate camera model.

7. The computer-assisted method of claim 1 wherein presenting the selected target position further comprises rendering a template for the selected target position using the estimated camera model associated with the selected target position.

8. The computer-assisted method of claim 1 wherein the calibration target is further defined as a plurality of visual fiducials, where each visual fiducial is uniquely identifiable from the remaining visual fiducials.

9. The computer-assisted method of claim 1 wherein the camera model is further defined as a radial distortion model.

10. The computer-assisted method of claim 1 further comprises executing steps (b), (c), (d), (g) and (h) using a processor residing on the camera.

11. A computer-assisted method for calibrating a camera, comprising:
    (a) initializing parameters of a camera model using image data of a calibration target captured by a camera, where the camera model defines a relationship between an image captured by the camera and a corresponding image without any distortion caused by the camera;
    (b) predicting parameters of the camera model for each of a plurality of candidate target positions, thereby yielding an estimated camera model for each of the plurality of candidate target positions;

(c) determining a certainty measure for each of the estimated camera models;
(d) selecting a target position from the plurality of candidate target positions, where the selected target position resulted in the estimated camera model having the smallest certainty measure;
(e) positioning the calibration target in relation to the selected target position using a robot;
(f) capturing, by the camera, image data of the calibration target while the calibration target is positioned proximate to the selected target position;
(g) computing parameters of the camera model using the image data captured by the camera of the calibration target while the calibration target is positioned proximate to the selected target position; and
(h) determining a certainty measure for the camera model using the computed parameters of the camera model.

12. The computer-assisted method of claim 11 further comprises repeating steps (b)-(h) until the certainty measure for the camera model is less than a threshold.

13. The computer-assisted method of claim 12 further comprises capturing, by the camera, image data of a scene subsequent to the calibration process and correcting the image data using the computed parameters of the camera model.

14. The computer-assisted method of claim 11 wherein predicting parameters of the camera model further comprises predicting where visual fiducials on the target would appear in an image using the parameters of the camera model and when the target is oriented in a given candidate target position, and computing parameters for an estimated camera model in part based on the predicted locations of the visual fiducials.

15. The computer-assisted method of claim 14 wherein computing parameters for an estimated camera model further comprises applying a least squares optimization method to the predicted locations of the visual fiducials and locations of visual fiducials on the target from previously acquired image data.

16. The computer-assisted method of claim 11 wherein the determination of a certainty measure for a given estimated camera model further comprises
sampling from the distribution for each of the parameters in the given camera model N times, thereby generating N sets of sampled parameters and each set of sampled parameters creates a hypothetical camera model;
for each set of sampled parameters, projecting a grid of points into a pixel space using the corresponding hypothetical camera model;
computing an expected reprojection error for each point in the grid; and
selecting expected reprojection error having the largest value as the certainty measure for the given estimate camera model.

17. The computer-assisted method of claim 11 wherein the calibration target is further defined as a plurality of visual fiducials, where each visual fiducial is uniquely identifiable from the remaining visual fiducials.

18. The computer-assisted method of claim 11 wherein the camera model is further defined as a radial distortion model.

19. The computer-assisted method of claim 11 further comprises executing steps (b), (c), (d), (g) and (h) using a processor residing on the camera.

* * * * *